(12) United States Patent
Rahman et al.

(10) Patent No.: US 10,572,295 B2
(45) Date of Patent: Feb. 25, 2020

(54) ORDERING OF INTERFACE ADAPTERS IN VIRTUAL MACHINES

(71) Applicant: ENTIT SOFTWARE LLC, Sanford, NC (US)

(72) Inventors: Reubenur Rahman, Bangalore (IN); Prashant Naik, Bangalore (IN); Raghuveer KV Shenoy, Bangalore (IN); Preethi Maria Dsilva, Bangalore (IN); Arun Kumar M, Bangalore (IN)

(73) Assignee: Micro Focus LLC, Santa Clara, CA (US)

(*) Notice: Subject to any disclaimer, the term of this patent is extended or adjusted under 35 U.S.C. 154(b) by 5 days.

(21) Appl. No.: 15/970,117

(22) Filed: May 3, 2018

(65) Prior Publication Data

US 2018/0321965 A1    Nov. 8, 2018

(30) Foreign Application Priority Data

May 5, 2017    (IN) .............................. 201741016008

(51) Int. Cl.

| G06F 9/455 | (2018.01) |
|---|---|
| G06F 9/54 | (2006.01) |
| G06F 9/48 | (2006.01) |
| G06F 9/50 | (2006.01) |

(52) U.S. Cl.
CPC .......... *G06F 9/45558* (2013.01); *G06F 9/455* (2013.01); *G06F 9/45533* (2013.01); *G06F 9/48* (2013.01); *G06F 9/50* (2013.01); *G06F 9/541* (2013.01); *G06F 2009/45579* (2013.01); *G06F 2009/45583* (2013.01); *G06F 2009/45595* (2013.01)

(58) Field of Classification Search
CPC .. G06F 9/455; G06F 9/45533; G06F 9/45558; G06F 2009/45579; G06F 2009/45583; G06F 9/48; G06F 9/50
See application file for complete search history.

(56) References Cited

U.S. PATENT DOCUMENTS

| 7,574,551 B2 | 8/2009 | Gundam |
| 8,503,468 B2 | 8/2013 | Akyol |
| 2012/0215941 A1* | 8/2012 | Brownlow ............ G06F 13/385 710/3 |

(Continued)

OTHER PUBLICATIONS

Adding vSRX Interfaces; 2016; 4 Pages.

(Continued)

*Primary Examiner* — Charles M Swift (57) ABSTRACT

A computing device includes a hardware processor and a machine-readable storage medium storing instructions. The instructions are executable by the processor to: initiate a virtual machine (VM) using a user specification including a plurality of virtual interface adapters in a first order; identify a first virtual slot associated with a first virtual interface adapter of the plurality of virtual interface adapters; identify, based on the first virtual slot, a first virtual device identifier associated with the first virtual interface adapter; identify, based on the first virtual device identifier, an ordered interface name of the first virtual interface adapter; and reorder, based on the ordered interface name, an interface ordering file to list the plurality of virtual interface adapters in a second order.

20 Claims, 7 Drawing Sheets

(56) References Cited

U.S. PATENT DOCUMENTS

2017/0031699 A1* 2/2017 Banerjee ............. G06F 9/45558
2018/0046484 A1* 2/2018 Baluch ................ G06F 9/45558
2018/0307498 A1* 10/2018 Yang .................... G06F 9/4411
2018/0337990 A1* 11/2018 Tasoulas ............... G06F 9/4856

OTHER PUBLICATIONS

Getting the network adapters' order in Windows; https://saltwetbytes.wordpress.com/2009/10/17/getting-network-adapter-order-in-windows/ ; 2010.
Re-Ordering VMware Network Adapters the Right Way—Existing Installation Process; http://www.troymitchell.net/re-ordering-vmware-network-adapters-the-right-way-existing-insta.
Rhel 6 nic order with 4 network adapter or more; https://communities.vmware.com/thread/443600; Apr. 17, 2013; 6 pages.

* cited by examiner

ORDERING OF INTERFACE ADAPTERS IN VIRTUAL MACHINES

BACKGROUND

A virtual machine is an abstraction of a physical computer, and may execute an operating system and/or application programs. Further, the virtual machine may include virtualized components representing hardware components of a computer. In some examples, the virtual machine may communicate over a data network.

BRIEF DESCRIPTION OF THE DRAWINGS

Some implementations are described with respect to the following figures.

DETAILED DESCRIPTION

A virtual machine (VM) may be initiated according to a specification provided by a user. The specification may include parameters and configuration data for the VM. For example, the specification may specify that the virtual machine includes a set of virtualized interface adapters to connect to multiple networks in a desired order. However, once the VM is initiated, the set of virtualized interface adapters may be arranged in a different order than that specified by the user. This change in order may cause the VM to not connect to the proper network, thus resulting in malfunction and/or confusion.

In accordance with some implementations, examples are provided for automatically reordering the interface order in a VM. As described further below with reference to FIGS. 1-7, some implementations may involve determining a virtual slot identifier, a virtual device identifier, and an ordered interface name associated with a first virtual interface adapter. The ordered interface name may be used to modify an interface ordering file to list the virtual interface adapters in a desired order. Accordingly, one or more implementations may provide automated reordering of virtual interface adapters to reflect the order specified by the user.

Figure 1:
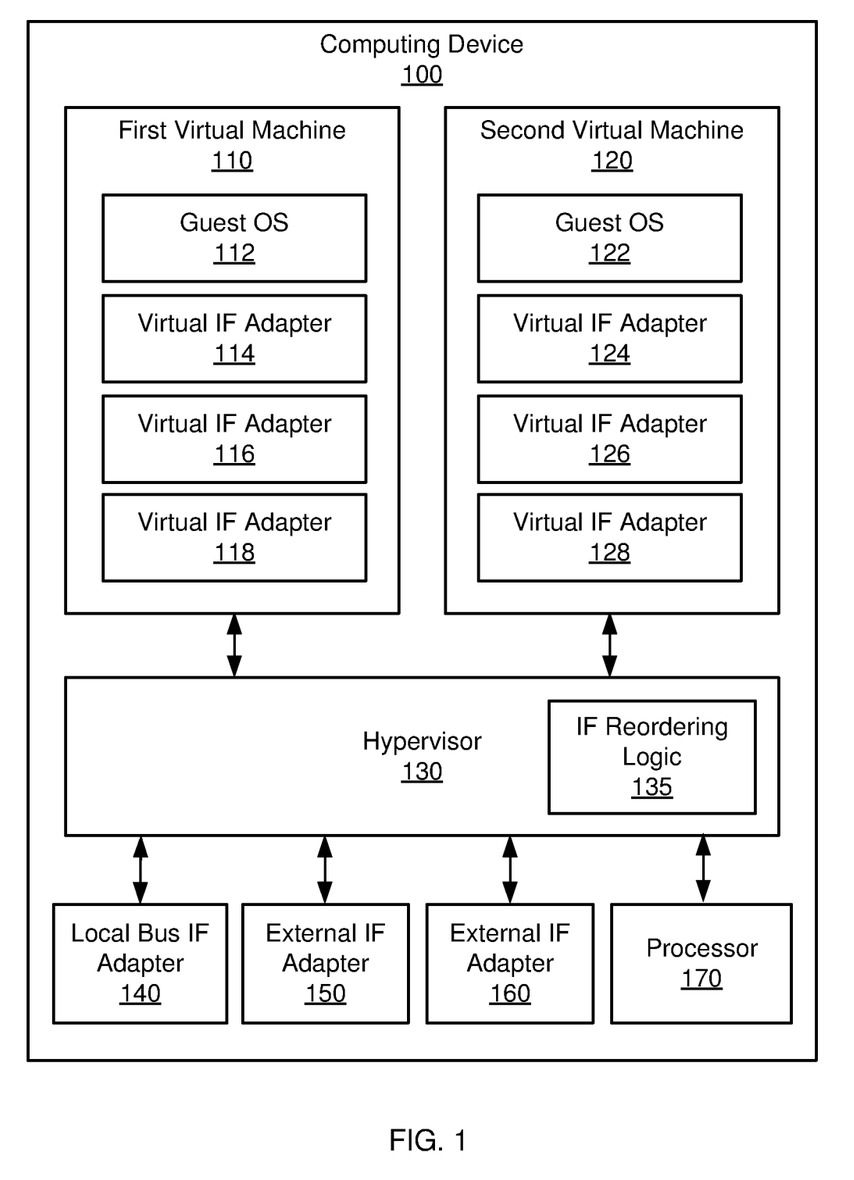
FIG. 1 is a schematic diagram of an example computing device, in accordance with some implementations.

FIG. 1 shows a schematic diagram of an example computing device 100, in accordance with some implementations. As shown, in some implementations, the computing device 100 may include a hypervisor 130 to initiate and manage a first VM 110 and a second VM 120. The first VM 110 may execute a guest operating system (OS) 112, and the second VM 120 may execute a guest operating OS 122.

In some implementations, the VMs 110, 120 may include virtualized components representing hardware components of the computing device 100. For example, the first VM 110 may include virtual interface (IF) adapters 114, 116, 118 that may represent some or all of a local bus IF adapter 140 and external IF adapters 150, 160. In another example, the second VM 120 may include virtual IF adapters 124, 126, 128 that may represent some or all of the local bus IF adapter 140 and external IF adapters 150, 160. In some implementations, the VMs 110, 120 may include other virtualized components (not shown in FIG. 1) that may represent other hardware components of the computing device 100, such as the processor 170, memory (not shown in FIG. 1), and so forth).

As shown in FIG. 1, the hypervisor 130 may include IF reordering logic 135. In some implementations, the IF reordering logic 135 may provide reordering of virtual IF adapters to reflect the order specified in a virtual machine specification. For example, the IF reordering logic 135 may determine a virtual slot, a virtual device identifier, and an ordered interface name associated with a first virtual interface adapter. Further, the IF reordering logic 135 may use the ordered interface name to reorder an interface ordering file. In some implementations, the hypervisor 130 and the IF reordering logic 135 may be implemented as instructions stored in a machine-readable storage (not shown), and executed by a processor (e.g., processor 170).

Figure 2:
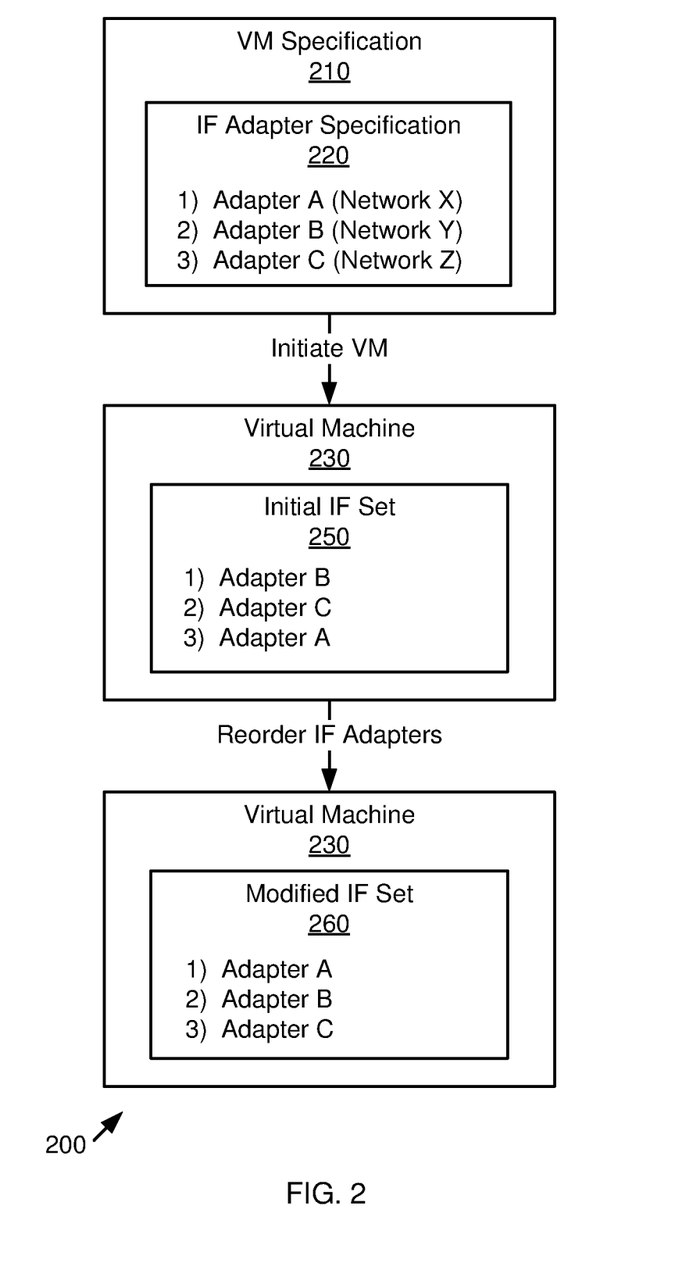
FIG. 2 is an illustration of an example operation, in accordance with some implementations.

Referring now to FIG. 2, shown is an illustration of an example operation 200 in accordance with some implementations. As shown, the example operation 200 may include initiating a VM 230 based on a VM specification 210. In some examples, the VM specification 210 may be specified by a user using a software application (e.g., hypervisor 130 shown in FIG. 1). In some implementations, the VM specification 210 may specify various aspects of a VM, including an IF adapter specification 220.

In some implementations, the IF adapter specification 220 may include a set of virtual IF adapters A, B, C specified in a desired order. Further, in some implementations, the IF adapter specification 220 may associate each virtual IF adapter with a corresponding network. For example, the IF adapter specification 220 may specify that a second virtual IF adapter B is to connect to an external network (e.g., an Ethernet network). In another example, the IF adapter specification 220 may specify that a first virtual IF adapter A is to connect to a local bus (e.g., a Peripheral Component Interconnect (PCI) bus). Further, the first virtual IF adapter A may be a PCI passthrough adapter which assigns a PCI device to a virtual machine.

As shown in FIG. 2, the VM specification 205 may be used to generate or initiate the VM 230. However, the generated VM 230 may include an initial IF set 150 of virtual IF adapters in an order (i.e., B, C, A) that is different from the order specified in the IF adapter specification 220 (i.e., A, B, C). Accordingly, the example operation 200 may include reordering the initial IF set 150 to generate a modified IF set 260 matching the order specified in the IF adapter specification 220. In some implementations, the modified IF set 260 may generated by the IF reordering logic 135 (shown in FIG. 1). For example, the IF reordering logic 135 may generate the modified IF set 260 in response to a generation of the VM 230.

Note that, while FIGS. 1-2 show example implementations, other implementations are possible. For example, while FIG. 1 shows the IF reordering logic 135 to be implemented as instructions included in the hypervisor 130, other implementations are possible. For example, it is contemplated that the IF reordering logic 135 could be hard-coded as circuitry included in the processor 170 and/or the computing device 100. In other examples, some or all of the IF reordering logic 135 could be implemented on a remote computer (not shown), as web services, and so forth. In another example, the IF reordering logic 135 may be implemented in one or more controllers of the computing device 100. In yet another example, it is contemplated that the computing device 100 may include additional components (e.g., memory, storage devices, buses, etc.). In still another example, it is contemplated that the VM specification 210 (shown in FIG. 2) may include specifications of additional components and/or parameters of a VM. Other combinations and/or variations are also possible.

Figure 3:
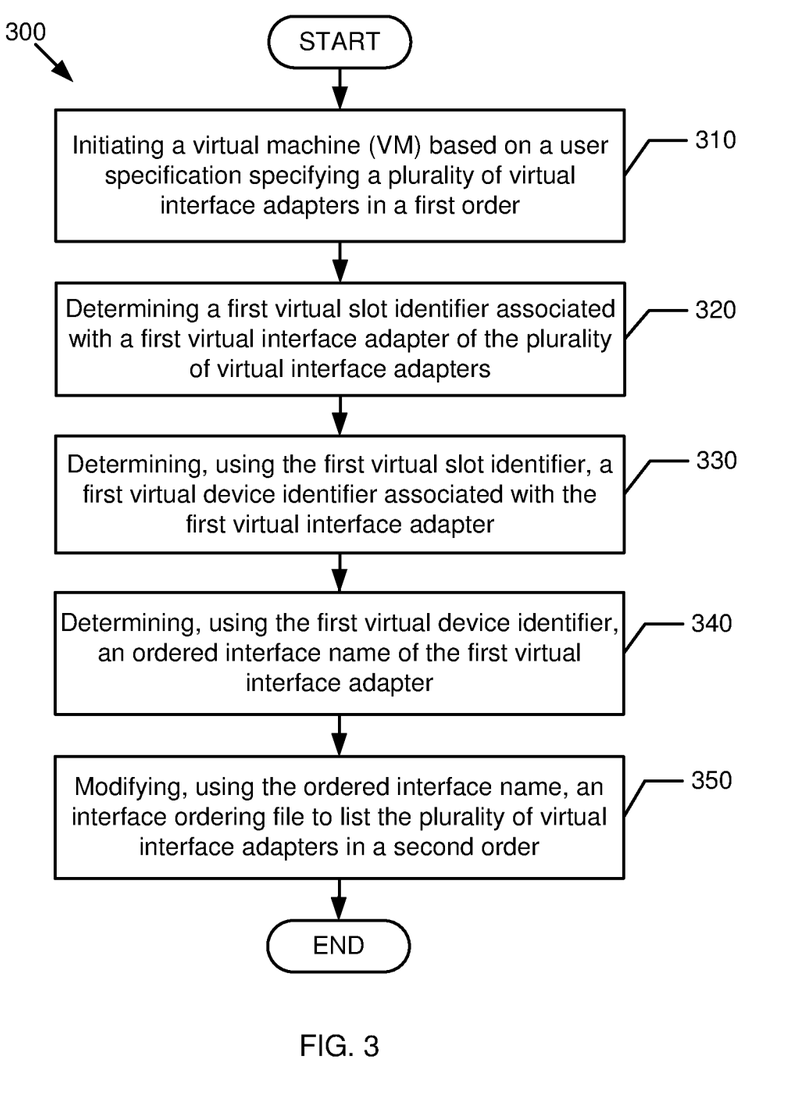
FIG. 3 is a flowchart of an example process, in accordance with some implementations.

Referring now to FIG. 3, shown is an example process 300 for interface reordering, in accordance with some implementations. The process 300 may be performed by the IF reordering logic 135 or the hypervisor 130 shown in FIG. 1. The process 300 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2, which show examples in accordance with some implementations. However, other implementations are also possible.

Block 310 may include initiating a virtual machine (VM) based on a user specification specifying a plurality of virtual interface adapters in a first order. For example, referring to FIGS. 1-2, the IF reordering logic 135 may generate the VM 230 based on a VM specification 210 specifying a set of virtual IF adapters specified in a desired order. In some examples, the generated VM 230 may include the initial IF set 250, which does not conform to the order in the VM specification 210.

Block 320 may include determining a first virtual slot identifier associated with a first virtual interface adapter of the plurality of virtual interface adapters. In some implementations, the first virtual slot may be a virtualized representation of a device slot to receive an interface adapter, and may be identified by a unique identifier (e.g., a slot number). For example, referring to FIG. 1, the IF reordering logic 135 may determine the first virtual slot assigned to the virtual IF adapter 114 in the VM 110.

Block 330 may include determining, using the first virtual slot identifier, a first virtual device identifier associated with the first virtual interface adapter. In some implementations, the first virtual device identifier may be a unique identifier of a virtual IF adapter within a VM. For example, referring to FIG. 1, the IF reordering logic 135 may determine the first virtual device identifier of the virtual IF adapter 114 using the first virtual slot identifier.

Block 340 may include determining, using the first virtual device identifier, an ordered interface name of the first virtual interface adapter. For example, referring to FIG. 1, the IF reordering logic 135 may determine the ordered interface name of the virtual IF adapter 114 using the first virtual device identifier. In some implementations, the ordered interface name may be a unique identifier assigned to a network interface within a virtual machine. Further, the ordered interface name may indicate (or is associated with) a particular location within an ordered sequence of interfaces of the virtual machine. In some examples, the ordered interface name may be composed of a text string (e.g., "eth") and a number (e.g., "0"), with the number designating the relative order of the identified interface with respect to other interfaces. For example, an interface with the ordered interface name "eth0" is in a higher position relative to an interface with the ordered interface name "eth1," which in turn is in a higher position relative to an interface with the ordered interface name "eth2," and so forth. As used herein, "higher position" refers to being in an earlier position in an ordered sequence.

Figure 4A:
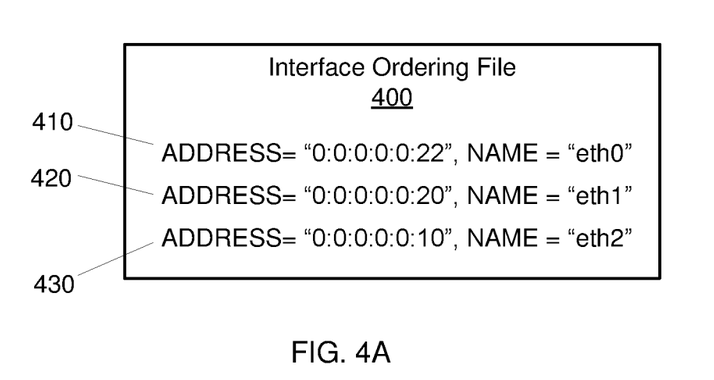
FIGS. 4A-4B are illustrations of example interface ordering files, in accordance with some implementations.

Block 350 may include modifying, using the ordered interface name, an interface ordering file to list the plurality of virtual interface adapters in a second order. An interface ordering file may be a file defining a persistent ordering of interfaces in a virtual machine. In some implementations, modifying the interface ordering file may involve identifying an entry of the interface ordering file matching the ordered interface name of the first virtual interface adapter. Referring to FIG. 4A, shown is an example interface ordering file 400, in accordance with some implementations. Assume that the interface ordering file 400 corresponds to a point in time prior to being modified (i.e., prior to completion of block 350). Assume further that the interface ordering file 400 includes entries 410, 420, 430 listed in a different order than that specified in an IF adapter specification (e.g., IF adapter specification 220 shown in FIG. 2). Assume also that the ordered interface name determined at block 340 is "eth2," and thus entry 430 may be determined to match the ordered interface name of the first virtual interface adapter.

Figure 4B:
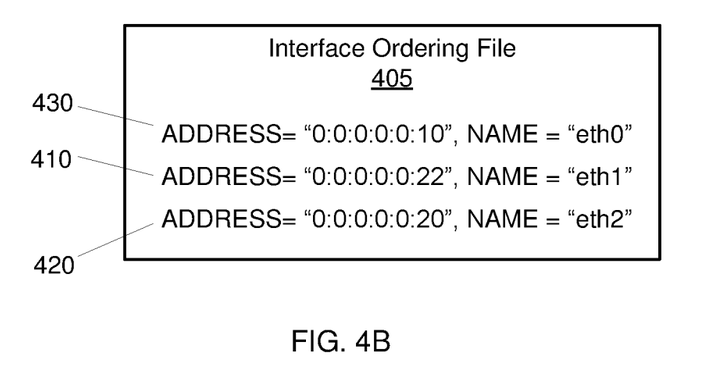

Referring again to block 350 shown in FIG. 3, in some implementations, modifying the interface ordering file may involve modifying the identified entry to be highest in an order, and modifying the remaining entries to be below the identified entry. For example, referring to FIG. 4B, shown is a modified interface ordering file 405, in accordance with some implementations. Note that, in the modified interface ordering file 405, the entry 430 matching the ordered interface name of the first virtual interface adapter is listed in a highest position, indicating that it is earliest or first in the order of the modified interface ordering file 405. Further, this highest position of entry 430 is reflected by the its ordered interface name "eth0." Note also that the remaining entries 410, 420 have been placed lower than entry 430, and now have ordered interface names "eth1" and "eth2," respectively. In some implementations, the remaining entries 410, 420 may represent virtual external network IF adapters (e.g., Ethernet adapters). Referring again to FIG. 3, the process 300 is completed after block 350.

Figure 5:
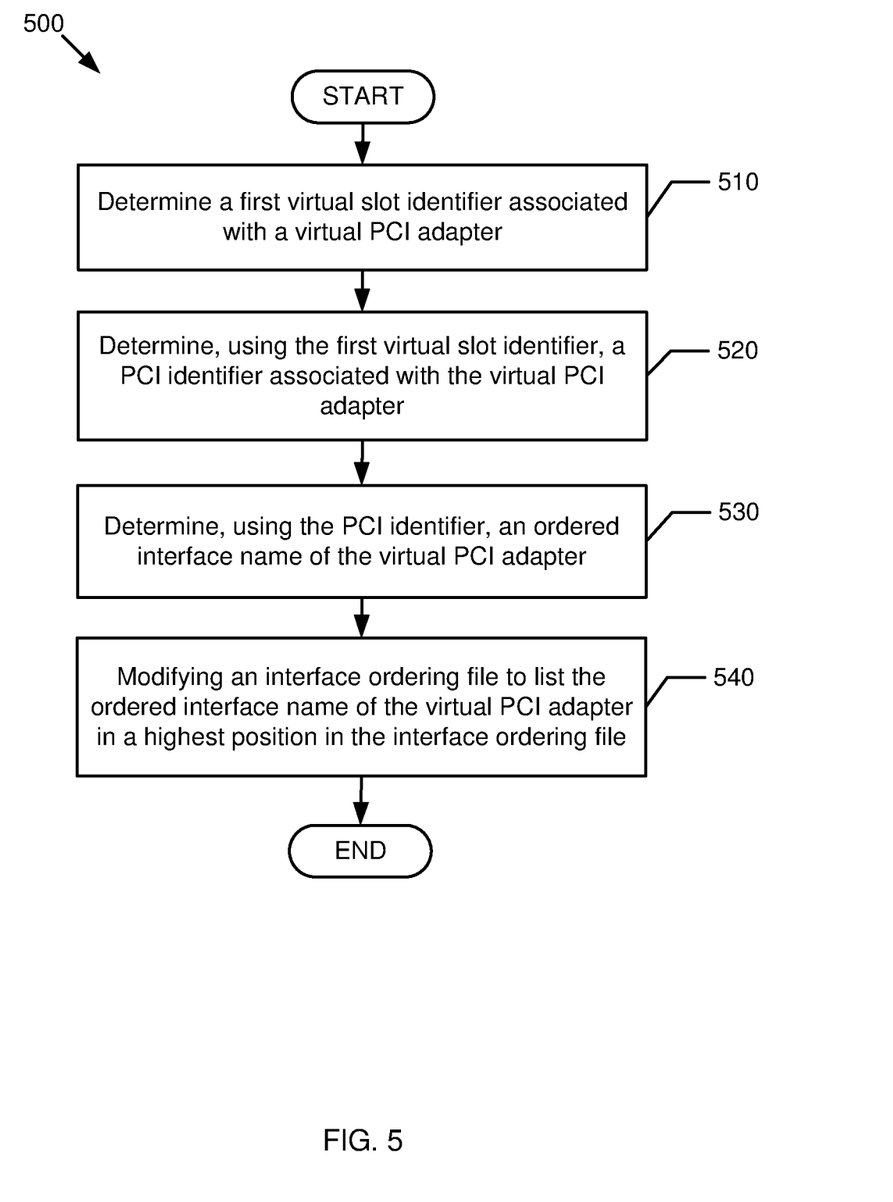
FIG. 5 is a flowchart of an example process, in accordance with some implementations.

Referring now to FIG. 5, shown is an example process 500 for interface reordering, in accordance with some implementations. The process 500 may be performed by the IF reordering logic 135 shown in FIG. 1. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1-4B, which show examples in accordance with some implementations. However, other implementations are also possible.

Block 510 may include determining a first virtual slot identifier associated with a virtual PCI adapter. In some implementations, the first virtual slot identifier may identify a virtual PCI slot associated with the virtual PCI adapter. For example, referring to FIG. 1, the IF reordering logic 135 may determine the virtual PCI slot associated with the virtual PCI adapter by querying an application programming interface (API) of a datacenter management application (not shown). In some examples, the virtual PCI adapter may be a PCI passthrough adapter which can assign a PCI device to a virtual machine.

Block 520 may include determining, using the first virtual slot identifier, a PCI identifier associated with the virtual PCI adapter. For example, referring to FIG. 1, the IF reordering logic 135 may determine a PCI identifier of the virtual PCI adapter by using the "lspci" command to access PCI device information associated with the first virtual slot identifier.

Block 530 may include determining, using the PCI identifier, an ordered interface name of the virtual PCI adapter. For example, referring to FIG. 1, the IF reordering logic 135 may determine the ordered interface name of the virtual PCI adapter by using the "ethtool" command to access network interface information associated with the PCI identifier.

Block 540 may include modifying an interface ordering file to list the ordered interface name of the virtual PCI adapter in a highest position in the interface ordering file. For example, referring to FIGS. 1 and 4B, the IF reordering logic 135 may generate the modified interface ordering file 405. Assume that entry 430 corresponds to the virtual PCI adapter, and thus is listed in a highest position of the interface ordering file 405. Further, the remaining entries 410, 420 have been has been placed below the entry 430 in the interface ordering file 405. In some implementations, the interface ordering file may be a "70-persistent-net-generator.rules" file included in Linux systems. Further, in some examples, the interface ordering file may include the media access control (MAC) addresses of each virtual IF adapter. After block 540, the process 500 is completed.

Figure 6:
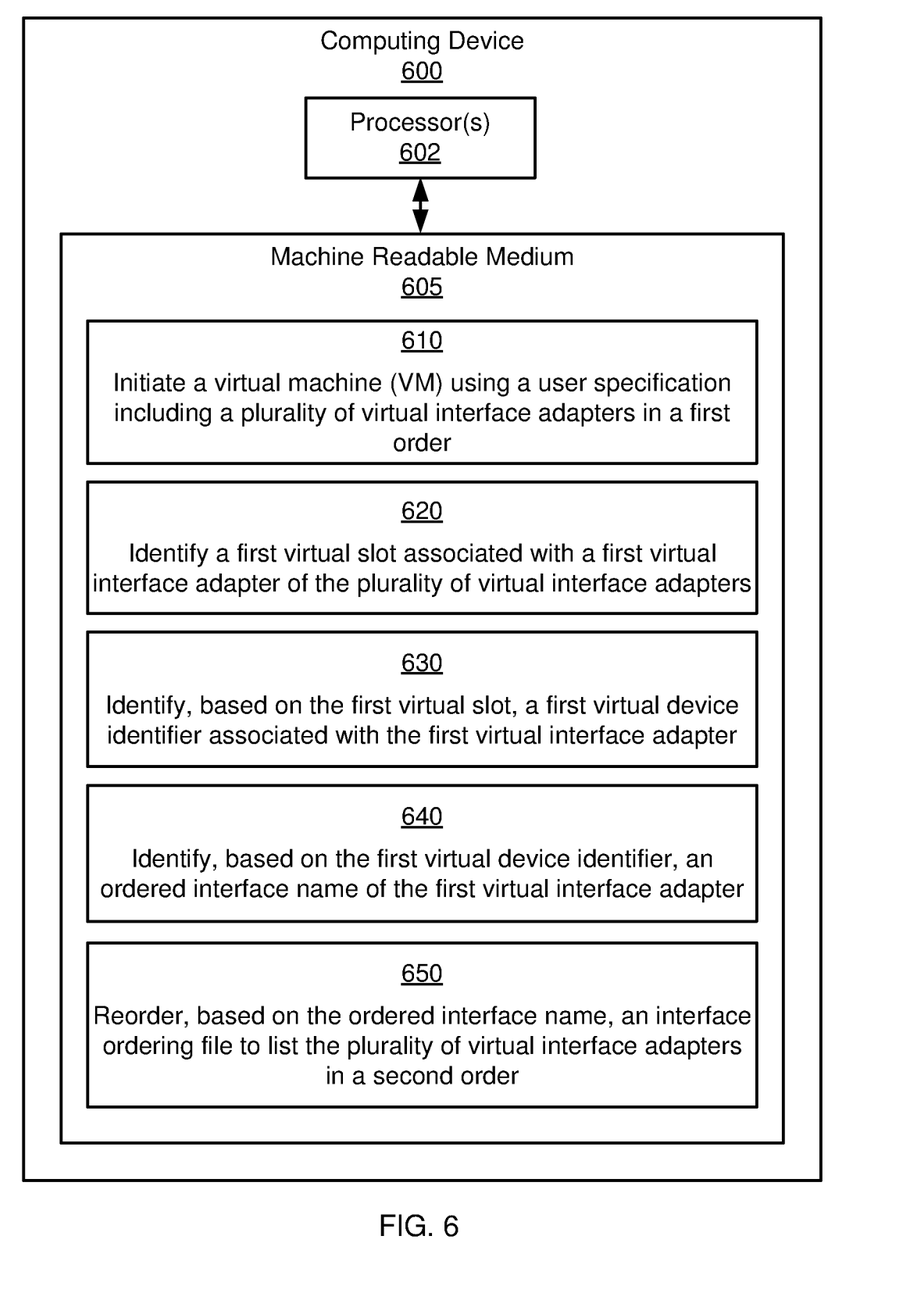
FIG. 6 is a schematic diagram of an example computing device, in accordance with some implementations.

Referring now to FIG. 6, shown is a schematic diagram of an example computing device 600. In some examples, the computing device 600 may correspond generally to the computing device 100 shown in FIG. 1. As shown, the computing device 600 may include processor(s) 602 and a machine readable medium 605. The machine-readable storage medium 605 may be a non-transitory medium, and may store instructions 610-650. The instructions 610-650 can be executed by the processor(s) 602.

Instruction 610 may initiate a virtual machine (VM) using a user specification including a plurality of virtual interface adapters in a first order. Instruction 620 may identify a first virtual slot associated with a first virtual interface adapter of the plurality of virtual interface adapters. Instruction 630 may identify, based on the first virtual slot, a first virtual device identifier associated with the first virtual interface adapter.

Instruction 640 may identify, based on the first virtual device identifier, an ordered interface name of the first virtual interface adapter. Instruction 650 may reorder, based on the ordered interface name, an interface ordering file to list the plurality of virtual interface adapters in a second order.

Figure 7:
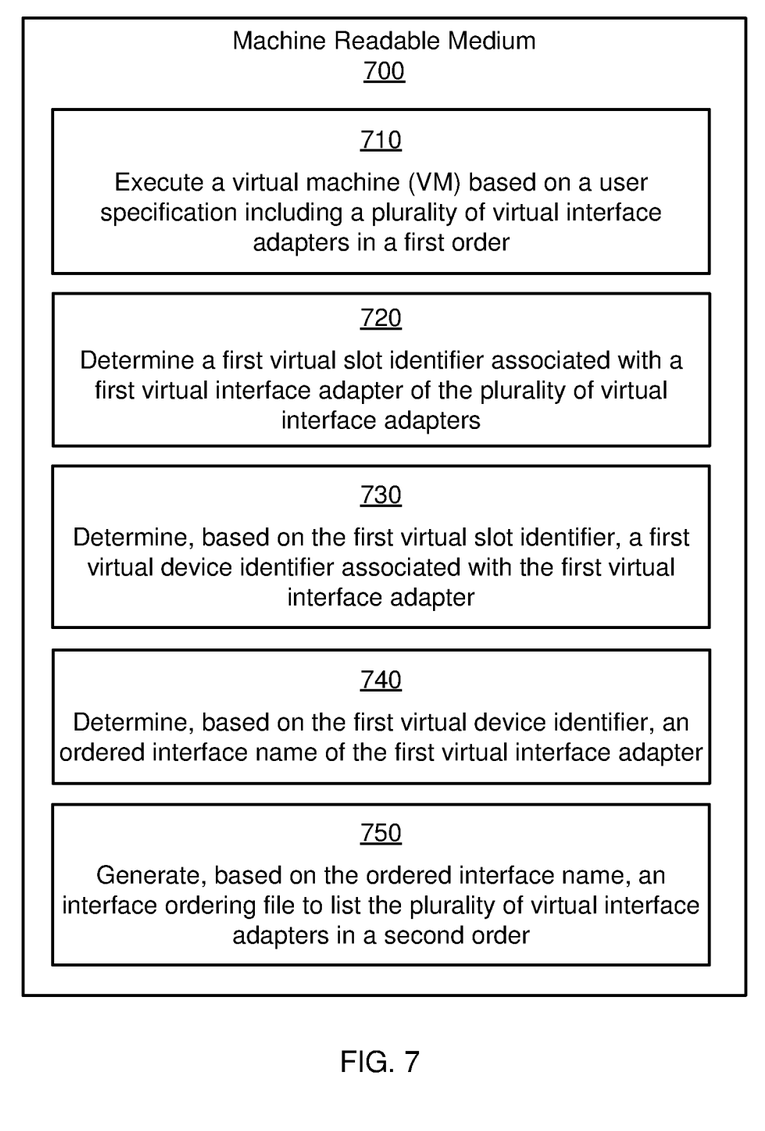
FIG. 7 is a diagram of an example machine-readable storage medium storing instructions in accordance with some implementations.

Referring now to FIG. 7, shown is a machine-readable storage medium 700 storing instructions 710-750, in accordance with some implementations. The instructions 710-750 can be executed by any number of processors (e.g., processor 170 shown in FIG. 1). The machine-readable storage medium 700 may be any non-transitory computer readable medium, such as an optical, semiconductor, or magnetic storage device.

Instruction 710 may execute a virtual machine (VM) based on a user specification including a plurality of virtual interface adapters in a first order. Instruction 720 may determine a first virtual slot identifier associated with a first virtual interface adapter of the plurality of virtual interface adapters. Instruction 730 may determine, based on the first virtual slot identifier, a first virtual device identifier associated with the first virtual interface adapter.

Instruction 740 may determine, based on the first virtual device identifier, an ordered interface name of the first virtual interface adapter. Instruction 750 may generate, based on the ordered interface name, an interface ordering file to list the plurality of virtual interface adapters in a second order.

In accordance with some implementations, examples are provided for automatically reordering the interface order in a VM. Some implementations may involve determining a virtual slot identifier, a virtual device identifier, and an ordered interface name associated with a first virtual interface adapter. The ordered interface name may be used to modify an interface ordering file to list the virtual interface adapters in a user-specified order.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device, comprising:
a hardware processor; and
a machine-readable storage medium storing instructions, the instructions executable by the hardware processor to:
initiate a virtual machine (VM) using a user specification including a plurality of virtual interface adapters in a first order;
identify a first virtual slot associated with a first virtual interface adapter of the plurality of virtual interface adapters;
identify, based on the first virtual slot, a first virtual device identifier associated with the first virtual interface adapter;
identify, based on the first virtual device identifier, an ordered interface name of the first virtual interface adapter; and
reorder, based on the ordered interface name, an interface ordering file to list the plurality of virtual interface adapters in a second order.

2. The computing device of claim 1, the instructions executable to identify an entry of the interface ordering file associated with the ordered interface name of the first virtual interface adapter.

3. The computing device of claim 2, the instructions executable to modify the identified entry to be in a highest position in an order of the interface ordering file.

4. The computing device of claim 3, the instructions executable to modify remaining entries of the interface ordering file to be below the identified entry.

5. The computing device of claim 4, wherein the remaining entries of the interface ordering file represent virtual external network adapters.

6. The computing device of claim 5, wherein the first virtual interface adapter is a virtual local bus adapter.

7. The computing device of claim 6, wherein the virtual local bus adapter is a Peripheral Component Interconnect (PCI) passthrough adapter assigned to the VM.

8. A computer implemented method comprising:
    initiating, by a hypervisor, a virtual machine (VM) based on a user specification specifying a plurality of virtual interface adapters in a first order;
    determining, by the hypervisor, a first virtual slot identifier associated with a first virtual interface adapter of the plurality of virtual interface adapters;
    determining, by the hypervisor, using the first virtual slot identifier, a first virtual device identifier associated with the first virtual interface adapter;
    determining, by the hypervisor, using the first virtual device identifier, an ordered interface name of the first virtual interface adapter; and
    modifying by the hypervisor, using the ordered interface name, an interface ordering file to list the plurality of virtual interface adapters in a second order.

9. The computer implemented method of claim 8, wherein determining the first virtual slot identifier comprises querying an application programming interface (API) of a datacenter management application.

10. The computer implemented method of claim 8, wherein determining the first virtual device identifier comprises using an "lspci" command to access virtual device information associated with the first virtual slot identifier.

11. The computer implemented method of claim 8, wherein determining the ordered interface name of the first virtual interface adapter comprises using an "ethtool" command to access interface information associated with the first virtual device identifier.

12. The computer implemented method of claim 8, wherein modifying the interface ordering file comprises:
    identifying an entry of the interface ordering file associated with the ordered interface name of the first virtual interface adapter;
    modifying the identified entry to be in a highest position in an order of the interface ordering file; and
    modifying remaining entries of the interface ordering file to be below the identified entry.

13. The computer implemented method of claim 12, wherein the remaining entries of the interface ordering file represent virtual external network adapters.

14. The computer implemented method of claim 13, wherein the first virtual interface adapter is a virtual local bus adapter.

15. An article comprising a non-transitory machine-readable storage medium storing instructions that upon execution cause a processor to:
    execute a virtual machine (VM) based on a user specification including a plurality of virtual interface adapters in a first order;
    determine a first virtual slot identifier associated with a first virtual interface adapter of the plurality of virtual interface adapters;
    determine, based on the first virtual slot identifier, a first virtual device identifier associated with the first virtual interface adapter;
    determine, based on the first virtual device identifier, an ordered interface name of the first virtual interface adapter; and
    generate, based on the ordered interface name, an interface ordering file to list the plurality of virtual interface adapters in a second order.

16. The article of claim 15, the instructions executable to identify an entry of the interface ordering file associated with the ordered interface name of the first virtual interface adapter.

17. The article of claim 16, the instructions executable to:
    modify the identified entry to be in a highest position in an order of the interface ordering file; and
    modify remaining entries of the interface ordering file to be below the identified entry.

18. The article of claim 17, wherein the remaining entries of the interface ordering file represent virtual external network adapters.

19. The article of claim 15, wherein the first virtual interface adapter is a virtual local bus adapter.

20. The article of claim 19, wherein the virtual local bus adapter is a Peripheral Component Interconnect (PCI) passthrough adapter assigned to the VM.

* * * * *